(12) United States Patent
Liu et al.

(10) Patent No.: US 12,532,295 B2
(45) Date of Patent: Jan. 20, 2026

(54) SIDELINK TRANSMISSION METHOD, TRANSMISSION APPARATUS, AND COMMUNICATION DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Huan Wang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 422 days.

(21) Appl. No.: 18/148,793

(22) Filed: Dec. 30, 2022

(65) Prior Publication Data

US 2023/0133434 A1 May 4, 2023

Related U.S. Application Data

(63) Continuation of application No. PCT/CN2021/104249, filed on Jul. 2, 2021.

(30) Foreign Application Priority Data

Jul. 3, 2020 (CN) .......................... 202010635601.5

(51) Int. Cl.
*H04W 72/40* (2023.01)
*H04L 1/1812* (2023.01)
(Continued)

(52) U.S. Cl.
CPC .......... *H04W 72/02* (2013.01); *H04L 1/1812* (2013.01); *H04W 72/25* (2023.01)

(58) Field of Classification Search
CPC ....... H04L 1/08; H04L 1/1812; H04L 1/1825; H04L 1/1854; H04L 1/1887; H04L 1/189;
(Continued)

(56) References Cited

U.S. PATENT DOCUMENTS 11,889,515 B2 * 1/2024 Yao ...................... H04L 1/1822
12,015,491 B2 * 6/2024 Lee ........................ H04L 1/189
(Continued)

FOREIGN PATENT DOCUMENTS

CN 109075921 A 12/2018
CN 110311762 A 10/2019
(Continued)

OTHER PUBLICATIONS

CATT, Discussion on mixed blind and HARQ-based retransmissions, 3GPP TSG-RAN WG2 Meeting #110-e, R2-2004981, 8 pages, Jun. 1-12, 2020.*
Spreadtrum Communications, Discussion on mixed blind and feedback-based HARQ retransmission for NR sidelink, 3GPP TSG-RAN WG2 Meeting #110-e, R2-2005043, 2 pages, Jun. 1-12, 2020.*
Intel Corporation, On mixing of blind and feedback based HARQ retransmissions, 3GPP TSG-RAN WG2 Meeting #110, R2-2005228, 2 pages, Jun. 1-12, 2020.*
(Continued)

*Primary Examiner* — Frank Duong
(74) *Attorney, Agent, or Firm* — The Webb Law Firm

(57) ABSTRACT

This application discloses a sidelink transmission method, a sidelink transmission apparatus, and a communication device, and pertains to the field of wireless communication technologies. The sidelink transmission method includes: determining a transmission manner based on whether an interval between two transmission resources or two transmission resource bundles meets a target interval requirement, where the transmission manner includes a HARQ feedback manner, and the transmission resource or the transmission resource bundle is a transmission resource or a transmission resource bundle provided in sidelink resource control signaling.

20 Claims, 5 Drawing Sheets

(51) Int. Cl.
*H04W 72/02* (2009.01)
*H04W 72/25* (2023.01)

(58) Field of Classification Search
CPC ... H04L 1/1896; H04L 5/0044; H04L 5/0053;
H04L 5/0055; H04L 5/0082; H04L
5/0091; H04L 5/0094; H04W 4/40;
H04W 72/02; H04W 72/0453; H04W
72/20; H04W 72/23; H04W 72/21; H04W
72/25; H04W 72/542; H04W 72/56;
H04W 92/18
See application file for complete search history.

(56) References Cited

U.S. PATENT DOCUMENTS

| | | | |
|---|---|---|---|
| 12,143,220 B2* | 11/2024 | Lee | H04W 72/40 |
| 2020/0099476 A1 | 3/2020 | Park | |
| 2020/0220694 A1* | 7/2020 | Khoryaev | H04W 28/04 |
| 2020/0374978 A1* | 11/2020 | Panteleev | H04W 72/0446 |
| 2021/0144750 A1* | 5/2021 | Cao | H04W 72/0453 |
| 2023/0231654 A1* | 7/2023 | Ganesan | H04L 5/0044 |
| | | | 370/329 |
| 2023/0269028 A1* | 8/2023 | Kang | H04L 1/1812 |
| | | | 370/329 |

FOREIGN PATENT DOCUMENTS

| | | |
|---|---|---|
| CN | 110798297 A | 2/2020 |
| CN | 110943809 A | 3/2020 |
| CN | 111107635 A | 5/2020 |
| CN | 111132329 A | 5/2020 |
| CN | 111278050 A | 6/2020 |
| KR | 1020200053831 A | 5/2020 |

OTHER PUBLICATIONS

Huawei, HiSilicon, Discussion on remaining MAC open issues for 5G V2X with NR SL, 3GPP TSG-RAN WG2 Meeting #110 electronic, R2-2005492, 44 pages, Jun. 1-12, 2020.*

China National Intellectual Property Administration, International Search Report issued in corresponding Application No. PCT/CN2021/104249, mailed Sep. 28, 2021.

3GPP TSG RAN WG1 Meeting #100bis. e-Meeting, Apr. 20-30, 2020. R1-2001805. Nokia, Nokia Shanghai Bell. Remaining details of resource allocation for sidelink—Mode 2.

3GPP TSG RAN WG1 Meeting #100bis. e-Meeting, Apr. 20-30, 2020. R1-2001886. LG Electronics. Discussion on resource allocation for Mode 2.

3GPP TSG RAN WG1 #100bis. e-Meeting, Apr. 20-30, 2020. R1-2002301. InterDigital, Inc. Remaining Issues on NR Sidelink Mode 2 Resource Allocation.

3GPP TSG RAN WG1 #100bis. e-Meeting, Apr. 20-30, 2020. R1-2002466. ASUSTeK. Remaining issues on sidelink resource allocation mode 1.

3GPP TSG RAN WG1 Meeting #101-E. e-Meeting May 25-Jun. 5, 2020. R1-2004715. Intel Corporation. FL summary#2 of critical issues for 7.2.4.2.2—V2X Mode 2.

3GPP TSG-RAN WG2 Meeting #110 electronic, Jun. 1-12, 2020. R2-2005492. Huawei, HiSilicon. Discussion on remaining MAC open issues for 5G V2X with NR SL.

Intel Corporation, "Remaining opens of resource allocation mode-2 for NR V2X design", 3GPP TSG RAN WG1 #100-E, e-meeting Feb. 24-Mar. 6, 2020, R1-2000731, Mobile Competence Centre, 16 pages.

* cited by examiner

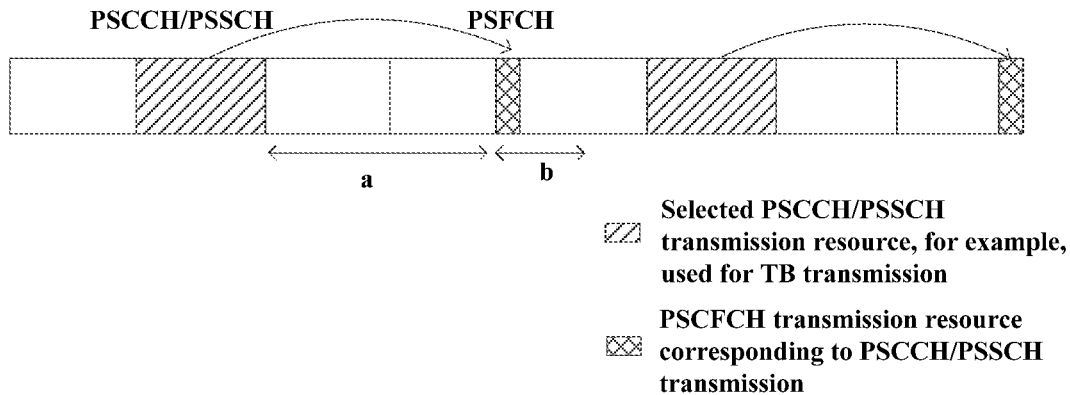

FIG. 3

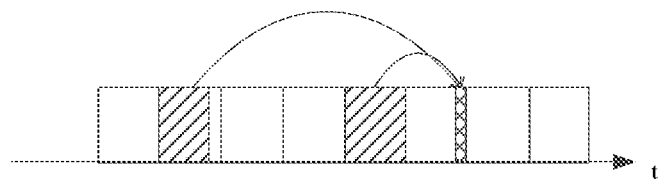

FIG. 4

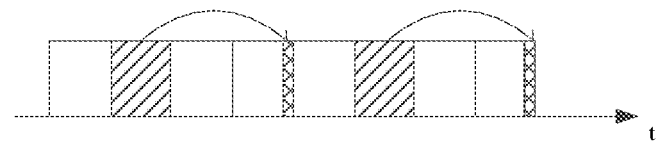

FIG. 5

Determine a transmission manner based on whether an interval between two transmission resources or two transmission resource bundles meet a target interval requirement, where the transmission manner includes a HARQ feedback manner, and the transmission resource or the transmission resource bundle is a transmission resource or a transmission resource bundle provided in sidelink resource control signaling — 61

SIDELINK TRANSMISSION METHOD, TRANSMISSION APPARATUS, AND COMMUNICATION DEVICE

CROSS-REFERENCE TO RELATED APPLICATIONS

This application is a continuation of International Application No. PCT/CN2021/104249, filed on Jul. 2, 2021, which claims priority to Chinese Patent Application No. 202010635601.5 filed in China on Jul. 3, 2020, which are incorporated herein by reference in their entireties.

TECHNICAL FIELD

This application pertains to the field of wireless communication technologies, and specifically relates to a sidelink transmission method, a sidelink transmission apparatus, and a communication device.

BACKGROUND

For hybrid automatic repeat request (HARQ) feedback-based sidelink (SL, which may also be referred to as a secondary link, a side link, or the like) transport block (TB) transmission, a transmit end (TX UE) needs to determine, based on a feedback result of previous physical sidelink shared channel (PSSCH) transmission, whether to perform next PSSCH retransmission. However, because a current control node (for example, a base station) does not know an actual transmission status on the SL, a feedback status, and whether HARQ feedback-based transmission or retransmission is required, a resource allocated by the control node cannot always ensure that a resource for next PSSCH transmission appears after the TX UE demodulates feedback information. Therefore, a user cannot determine whether to perform retransmission based on an actual HARQ status, which leads to a decrease in reliability, and may lead to hybrid transmission of HARQ feedback-based transmission and blind retransmission. Consequently, processing complexity of a receiving user is increased.

SUMMARY

According to a first aspect of the present disclosure, a sidelink transmission method is provided and is applied to a communication device, and the method includes:

determining a transmission manner based on whether an interval between two transmission resources or two transmission resource bundles meets a target interval requirement, where the transmission manner includes a HARQ feedback manner, and the transmission resource or the transmission resource bundle is a transmission resource or a transmission resource bundle provided in sidelink resource control signaling.

According to a second aspect of the present disclosure, a sidelink transmission apparatus is provided, including:

a first determining module, configured to determine a transmission manner based on whether an interval between two transmission resources or two transmission resource bundles meets a target interval requirement, where the transmission manner includes a HARQ feedback manner, and the transmission resource or the transmission resource bundle is a transmission resource or a transmission resource bundle provided in sidelink resource control signaling.

According to a third aspect of the present disclosure, a communication device is provided. The communication device includes a processor, a memory, and a program or an instruction that is stored in the memory and that can run on the processor, and when the program or the instruction is executed by the processor, steps in the method described in the first aspect are implemented.

According to a fourth aspect of the present disclosure, a readable storage medium is provided, where the readable storage medium stores a program or an instruction, and when the program or the instruction is executed by a processor, steps in the method described in the first aspect are implemented.

According to a fifth aspect of the present disclosure, a chip is provided. The chip includes a processor and a communication interface, the communication interface is coupled to the processor, and the processor is configured to run a program or an instruction of a network side device to implement the method described in the first aspect.

BRIEF DESCRIPTION OF DRAWINGS

FIG. 2 and FIG. 3 are schematic diagrams of a and b for determining HARQ RTT time;

FIG. 4 and FIG. 5 are schematic diagrams of a case in which two adjacent transmission resources provided by a control node do not meet HARQ RTT time;

FIG. 6 is a schematic flowchart of a sidelink transmission method according to an embodiment of this application;

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

It should be noted that the technology described in the embodiments of this application is not limited to a Long Term Evolution (LTE)/LTE-advanced (LTE-A) system, and may also be used in various wireless communication systems, for example, Code Division Multiple Access (CDMA), Time Division Multiple Access (TCDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application are often used interchangeably. The described technology may be used in the foregoing system and radio technology, and may also be used in another system and radio technology. However, a New Radio (NR) system is described below as an example, and the term NR is used in most of the descriptions, although these technologies can also be used in an application other than an application of the NR system, for example, a sixth generation (6G) communication system.

Figure 1:
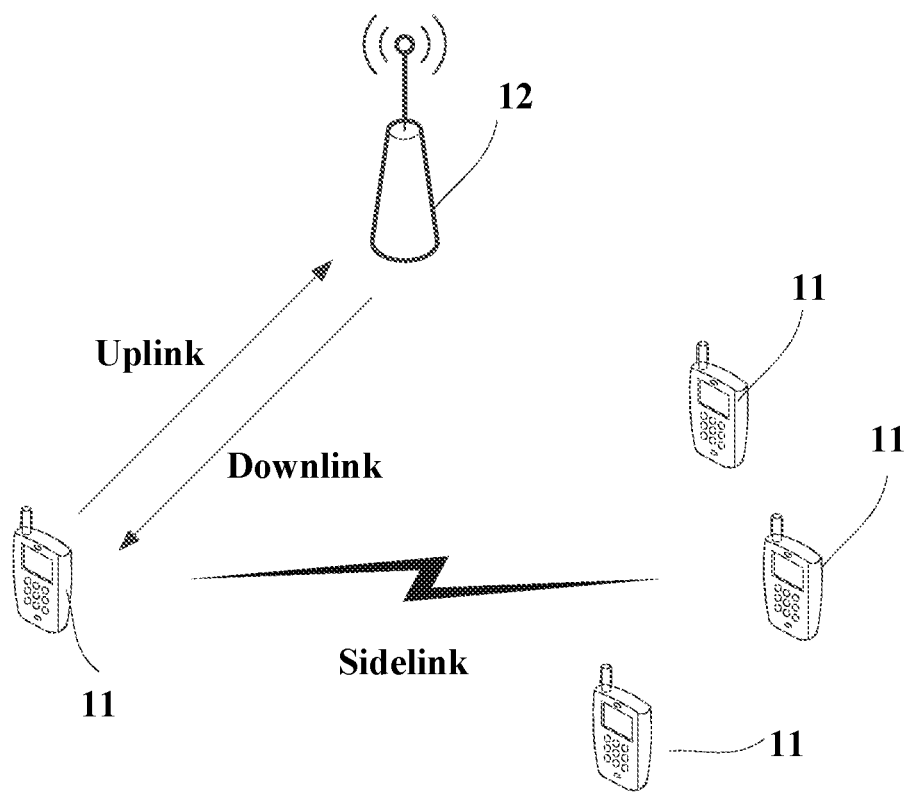
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or a vehicle-mounted device (VUE), or a pedestrian terminal (PUE). The wearable device includes a band, a headset, eyeglasses, or the like. It should be noted that a specific type of the terminal 11 is not limited in this embodiment of this application. The network side device 12 may be a base station or a core network. The base station may be referred to as a NodeB, an evolved Node B, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another suitable term in the field provided that a same technical effect is achieved. The base station is not limited to a specific technical term. It should be noted that, in this application, only a base station in an NR system is used as an example, but a specific type of the base station is not limited.

Related communication terms in the embodiments of this application are described below.

(1) Sidelink HARQ Feedback

To improve reliability and validity of sidelink transmission, sidelink HARQ is introduced into an NR internet of things (V2X). On a sidelink, a sending terminal (TX UE) sends data/TB to a receiving terminal (RX UE), and the receiving terminal determines whether the data is successfully received, and if the data is successfully received, the receiving terminal feeds back an ACK to a sending node, or otherwise feeds back a NACK.

The sidelink supports unicast (unicast) transmission, groupcast transmission, and broadcast transmission, and the unicast transmission and the groupcast transmission need to support sidelink HARQ feedback. For the unicast transmission, RX UE feeds back an ACK/NACK on a physical sidelink feedback channel (PSFCH) resource of the RX UE.

For the groupcast transmission, there are at least two feedback forms: (1) The RX UE shares the PSFCH resource, and the RX UE feeds back only a NACK, and for a case that a TB is successfully demodulated, the RX UE does not perform any feedback. (2) The RX UE occupies different PSFCH resources, and the RX UE feeds back an ACK/NACK on respective resources.

Transmission of the TB occurs on a physical sidelink shared channel (PSSCH) resource, and transmission of the ACK/NACK occurs on a corresponding PSFCH resource (corresponding PSFCH).

(2) Sidelink Physical Sidelink Control Channel (PSCCH)/PSSCH Retransmission Form The sidelink supports two PSSCH retransmission forms: One is HARQ feedback-based transmission or retransmission (HARQ feedback based retransmission), and the other is blind retransmission. If the TX UE uses HARQ feedback-based transmission or retransmission, RX UE needs to perform HARQ feedback for a PSSCH transmitted by the TX UE, and the TX UE determines, based on the HARQ feedback, whether to retransmit the PSSCH. If the TX UE uses blind retransmission, the TX UE directly performs PSSCH transmission on a retransmission resource, that is, does not depend on HARQ feedback.

Currently, separate blind retransmission and HARQ feedback-based transmission or retransmission on different transmission resources are not supported for multiple transmission resources of one TB. For example, if a user obtains two transmission resources, and intends to use the two transmission resources for retransmission of a TB, either blind retransmission or HARQ feedback-based transmission or retransmission is performed on both the two transmission resources. For transmission of a TB, if a HARQ feedback state corresponding to initial transmission or a specific time of retransmission of the TB is an ACK, or the user determines that the transmission succeeds, the user releases another transmission resource reserved for the TB.

(3) Sidelink Resource Selection

The sidelink has at least two resource assignment modes: Mode 1 (mode1) and mode 2 (mode 2). For the mode 1, a control node assigns a transmission resource to the TX UE, and for the mode 2, the TX UE independently selects a transmission resource.

At least for the mode 2, to ensure that a resource used for PSSCH retransmission appears after the TX UE demodulates feedback information, it is specified that a time interval between PSSCH transmission resources selected in any two times needs to be greater than HARQ round-trip time (RTT).

The HARQ RTT time Z=a+b, where a is a time interval between an end of a last symbol transmitted by a first PSSCH and a start of a first symbol received by a corresponding PSFCH, and a is determined by a resource pool configuration and higher layer parameters of MinTimeGapPSFCH and periodPSFCHresource;

b is time required by a PSFCH to receive and process retransmission preparations, includes multiplexing of a necessary physical channel and any TX-RX/RX-TX handover time, and is determined by the UE.

Figure 2:
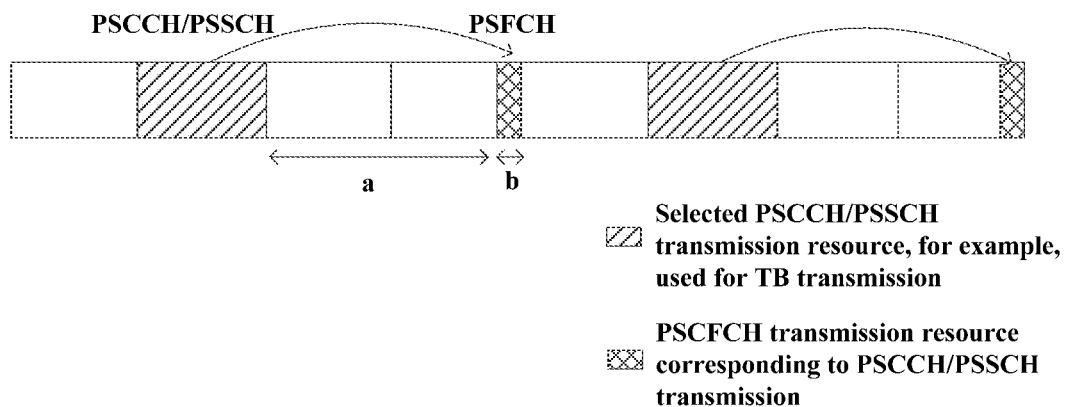

FIG. 2 and FIG. 3 are schematic diagrams of a and b for determining HARQ RTT time. In FIG. 2, a value of b is relatively small, and the PSFCH can receive and process retransmission preparations in a slot in which the PSFCH is located. In FIG. 3, a value of b is relatively large, and receiving and processing of retransmission preparations of the PSFCH need to cross slots.

(4) Sidelink Resource Reservation

The TX UE reserves resources allocated by the TX UE. Reservation is divided into periodic reservation and non-periodic reservation. The reserved resources are used for future PSSCH and/or PSCCH transmission. A reservation period may be indicated in sidelink control information (SCI).

When the user obtains a resource from the control node (for example, the control node assigns, indicates, or recommends a resource to the user, typically, in a case of the mode 1), two adjacent transmission resources (for example, PSSCH and/or PSCCH resources) provided by the control node may not meet the HARQ RTT time, as shown in FIG. 4 and FIG. 5. For a case of FIG. 4, two adjacent transmission resources (corresponding to a same TB) correspond to a same PSFCH occasion. For a case of FIG. 5, although two adjacent transmission resources (corresponding to a same TB) correspond to different PSFCH occasions, time required by the TX UE to process a previous transmission resource and/or a PSFCH corresponding to the previous transmission resource is relatively long, and preparations for PSSCH retransmission cannot be made when a next transmission resource arrives. FIG. 4 shows a normal case, but not the possibility of occurrence of the case shown in FIG. 5 is not excluded.

In the foregoing case, it is not clear how the user performs transmission.

A sidelink transmission method, a sidelink transmission apparatus, and a communication device provided in the embodiments of this application are described in detail below with reference to the accompanying drawings by using specific embodiments and application scenarios thereof.

First, it should be noted that the communication device in the embodiments of this application may be a control node in a sidelink system, or may be a sidelink terminal. For example, the control node may be a network side device (such as a base station), a roadside unit (RSU), a head user terminal, a user terminal with a scheduling capability, a user terminal (such as a receiving user) that can recommend a transmission resource or indicate a transmission resource.

Referring to FIG. 6, an embodiment of this application provides a sidelink transmission method, applied to a communication device and including the following steps.

Step 61: Determine a transmission manner based on whether an interval between two transmission resources or two transmission resource bundles meet a target interval requirement, where the transmission manner includes a HARQ feedback manner, and the transmission resource or the transmission resource bundle is a transmission resource or a transmission resource bundle provided in sidelink resource control signaling.

Transmission involved in this embodiment of this application includes at least one of receiving and transmitting.

In the embodiments of this application, when providing multiple transmission resources or transmission resource bundles, a control node may dynamically determine a transmission manner based on whether transmission resources or transmission resource bundles provided by the control node meet a target interval requirement, for example, whether to enable HARQ feedback (a HARQ feedback manner), to adapt to a characteristic of a packet, so as to ensure, during HARQ feedback-based transmission or retransmission, that a next transmission resource appears after TX UE demodulates feedback information, thereby avoiding a waste of transmission resources and ensuring a low delay, reliability, and resource utilization.

Meanings of the two transmission resources or the two transmission resource bundles are described below.

In this embodiment of this application, optionally, the two transmission resources are two transmission resources in target transmission resources, and the two transmission resource bundles are two transmission resource bundles in the target transmission resources.

Optionally, the target transmission resources are all transmission resources provided in the sidelink resource control signaling.

In this embodiment of this application, further optionally, the two transmission resources are two adjacent transmission resources in the target transmission resources, any two transmission resources in the target transmission resources, or two preset transmission resources in the target transmission resources. The two preset transmission resources may be the first two transmission resources in the target transmission resources, the latest two transmission resources, and two transmission resources corresponding to preset numbers or locations. The two transmission resource bundles are two adjacent transmission resource bundles in the target transmission resources, any two transmission resource bundles in the target transmission resources, or two preset transmission resource bundles in the target transmission resources. The two preset transmission resource bundles may be the first two transmission resource bundles in the target transmission resources, the latest two transmission resource bundles, and two transmission resource bundles corresponding to preset numbers or locations.

That an interval between two adjacent transmission resources or transmission resource bundles in the target transmission resources meets or does not meet the target interval requirement may be understood as follows: An interval between all two adjacent transmission resources or transmission resource bundles in the target transmission resources meets or does not meet the target interval requirement; or an interval between at least two adjacent transmission resources or transmission resource bundles in the target transmission resource meets or does not meet the target interval requirement.

That an interval between any two adjacent transmission resources or transmission resource bundles in the target transmission resources meets or does not meet the target interval requirement may be understood as follows: An interval between all two transmission resources or transmission resource bundles in the target transmission resources meets or does not meet the target interval requirement; or an interval between at least two transmission resources or transmission resource bundles in the target transmission resource meets or does not meet the target interval requirement.

In this embodiment of this application, the target transmission resources include one or more transmission resources.

In this embodiment of this application, optionally, the target transmission resource is at least one of the following:

(1) A transmission resource used for one transport block (TB) or one MAC PDU;

(11) For example, transmission resources that are indicated by one or more pieces of SL downlink control information (DCI) and that are used for a same TB or MAC PDU.

(12) For example, transmission resources that are one or more pieces of SL DCI and/or sidelink configured grant (SL CG) and that are used for a same TB or MAC PDU.

The SL DCI is DCI for scheduling, activating, or deactivating an SL resource, such as DCI 3-0.

In this embodiment of this application, a transmission resource used for one transport block (TB) or one MAC PDU may be a resource that may be used to transmit the TB or the MAC PDU (meaning that some resources may not be used for the TB or the MAC PDU), or may be a resource that is actually used to transmit the TB or the MAC PDU.

The sidelink configuration grant may be at least one of SL CG type 1, SL CG type 2, or SL semi-persistent scheduling (SPS).

(2) A transmission resource indicated in dynamic control signaling

(21) For example, a transmission resource indicated by one piece of SL DCI.

(22) For example, a dynamic resource scheduled, indicated, or recommended by the control node or another terminal.

(3) A transmission resource indicated in semi-static control signaling.

(31) For example, a transmission resource in each period of sidelink configured grant.

(32) For example, a semi-static resource scheduled, indicated, or recommended by the control node or another terminal.

The dynamic resource may also be interpreted as an aperiodic resource.

The foregoing dynamic control signaling may be dynamic sidelink control signaling. The semi-static control signaling may be semi-static sidelink control signaling.

In this embodiment of this application, optionally, the target transmission resource is provided in using sidelink (SL) resource control signaling, and the sidelink resource control signaling includes at least one of the following:

sidelink downlink control information (DCI), which is referred to as SL DCI, where the SL DCI is DCI for scheduling, activating, or deactivating an SL resource, for example, DCI scrambled by an SL-RNTI or an SL-CS-RNTI, for example, a DCI format 3-0;

a sidelink configuration grant (SL CG);

a media access control control element (MAC CE);

radio resource control (RRC) signaling; and a predetermined sidelink signal or channel, for example, SCI, an SCI format, a sidelink feedback control channel (SFCI), a PSFCH, a PSSCH, a PSCCH, a physical sidelink discover channel (PSDCH), or another sidelink signal or channel.

Optionally, when the control node is a user, the control node may indicate, schedule, or recommend a resource to another user by using a MAC CE, RRC, or a predetermined sidelink signal or channel.

In this embodiment of this application, optionally, before the determining a transmission manner based on whether an interval between two transmission resources or two transmission resource bundles meets a target interval requirement, the method further includes: obtaining a target transmission resource from the control node.

A meaning of the transmission resource bundle is described below.

In this embodiment of this application, optionally, transmission resources provided in one SL resource control signaling (for example, one piece of SL DCI or one SL CG) are considered as one transmission resource bundle (bundle), and each transmission resource in the transmission resource bundle is considered as one SL grant. Optionally, each transmission in the transmission resource bundle is independent.

In this embodiment of this application, optionally, that the interval between the two transmission resource bundles meets the target interval requirement includes: an $I^{th}$ transmission resource in one of the two transmission resource bundles and a $J^{th}$ transmission resource in the other transmission resource bundle meet the target interval requirement; where I and J are positive integers.

In this embodiment of this application, optionally, the first transmission resource in one of the two transmission resource bundles and the first transmission resource in the other transmission resource bundle meet the target interval requirement. In other words, both I and J are 1.

In this embodiment of this application, optionally, a quantity of transmission resources in one of the two transmission resource bundles is I, a quantity of transmission resources in the other transmission resource bundle is J, and the last (that is, the $I^{th}$) transmission resource in one of the two transmission resource bundles and the last (that is, the $J^{th}$) transmission resource in the other transmission resource bundle meet the target interval requirement.

In this embodiment of this application, optionally, a transmission resource in the first (that is, I=1) transmission resource in one of the two transmission resource bundles (which is assumed as a transmission resource bundle 1) and the last (a quantity of transmission resources in the other transmission resource bundle is J, that is, the $J^{th}$) transmission resource in the other transmission resource bundle (which is assumed as a transmission resource bundle 2) meets the target interval requirement. Optionally, in this case, the first transmission resource in the transmission resource bundle 1 is after the last transmission resource in the transmission resource bundle 2.

In this embodiment of this application, optionally, I=J.

In this embodiment of this application, optionally, the two transmission resource bundles are for transmission of a same TB.

In this embodiment of this application, optionally, the two transmission resource bundles are transmission resource bundles with a same HARQ process (process) ID that are granted by a same sidelink configuration, or the two transmission resource bundles are transmission resource bundles that are in two adjacent periodicities and that are granted by a same sidelink configuration.

In this embodiment of this application, advantages of setting the transmission resource bundle are that whether multiple transmission resources in one piece of SL DCI or one SL CG meet the target interval requirement is not considered, and whether a problem of mixed (mixed) blind retransmission and HARQ feedback-based transmission or retransmission occurs is not considered.

In this embodiment of this application, optionally, the meeting the target interval requirement includes one of the following:

greater than or equal to a+b;

greater than or equal to a+b+c;

greater than or equal to a+b+c+d; where a is time between data transmission of the first one in the two transmission resources or the two transmission resource bundles and a corresponding PSFCH;

b is time required by a PSFCH to receive and process retransmission preparations;

c is time required for processing PUCCH or PUSCH transmission; and a is time required for processing a PDCCH.

a+b is the HARQ RTT time in the foregoing content.

Optionally, a is a minimum time interval requirement between an end of a last symbol of first data transmission in the two transmission resources or transmission resource bundles and a start of a first symbol received by a corresponding PSFCH.

Optionally, b is a minimum time interval requirement for the PSFCH to receive and process retransmission preparations.

Optionally, c is a minimum time interval requirement required for processing PUCCH or PUSCH transmission.

Optionally, d is a minimum time interval requirement required for processing the PDCCH, and includes a minimum time interval requirement for PDCCH decoding and/or a minimum time interval requirement for PDCCH scheduling data.

Optionally, the minimum time interval requirement may be understood as a processing time requirement.

A specific method for determining the transmission manner based on whether the interval between the two transmission resources or the two transmission resource bundles meets the target interval requirement is described below.

(1) First, a method for determining the transmission manner when the interval between the two transmission resources or the two transmission resource bundles does not meet the target interval requirement is described.

That the interval between the two transmission resources or the two transmission resource bundles does not meet the target interval requirement may also be described as follows: An interval between two transmission resources or two transmission resource bundles in the target transmission resources does not meet the target interval requirement, or an interval between two adjacent transmission resources or two adjacent transmission resource bundles in the target transmission resources does not meet the target interval requirement, or an interval between any two transmission resources or any two transmission resource bundles in the target transmission resource does not meet the target interval requirement, or an interval between at least partial transmission resources in the target transmission resources does not meet the target interval requirement, or an interval between two preset transmission resources or two preset transmission resource bundles in the target transmission resources does not meet the target interval requirement.

That the interval between the two transmission resources or the two transmission resource bundles does not meet the target interval requirement may also be described as follows: At least partial selected target transmission resources that are in the target transmission resources and that are used for one TB or MAC PDU do not meet the target interval requirement. For example, when HARQ feedback-based transmission or retransmission needs to be performed on one TB or media access control protocol data unit (MAC PDU), at least partial selected target transmission resources that are in the target transmission resources and that are used for the TB or the MAC PDU does not meet the target interval requirement.

In this embodiment of this application, optionally, and the determining a transmission manner based on whether an interval between two transmission resources or two transmission resource bundles meets a target interval requirement includes:

if the interval between the two transmission resources or the two transmission resource bundles does not meet the target interval requirement, determining that the transmission manner includes at least one of the following:

(a) HARQ enable/disable (HARQ enable/disable) indication information of each transmission resource indicates disable (disable).

In other words, the determined HARQ feedback manner is: HARQ enable/disable indication information of each transmission resource indicates disable.

Each transmission resource may be each transmission resource in the target transmission resources, or may be each transmission resource in the two transmission resources or the two transmission resource bundles.

Optionally, the HARQ enable/disable indication information is HARQ enable/disable indication information in the sidelink control signaling (such as SCI).

Optionally, that the HARQ enable/disable indication information of each transmission resource indicates disable may be that the HARQ enable/disable indication information of each transmission resource indicates that a value corresponding to disable.

(b) Non-HARQ feedback-based transmission or retransmission is mapped on at least partial transmission resources in the two transmission resources or the two transmission resource bundles.

The mapping non-HARQ feedback-based transmission or retransmission may also be described as: not performing HARQ feedback-based transmission or retransmission.

Mapping transmission may be interpreted as mapping a logical channel or mapping data of a logical channel.

Optionally, the mapping non-HARQ feedback-based transmission or retransmission means mapping transmission of a logical channel that does not require HARQ feedback.

Optionally, non-HARQ feedback-based transmission or retransmission is mapped on the two transmission resources or the two transmission resource bundles.

Further optionally, non-HARQ feedback-based transmission or retransmission is mapped on each transmission resource in the target transmission resources.

(c) At least partial transmission resources in the two transmission resources or the two transmission resource bundles are ignored during transmission.

(d) At least partial transmission resources in the two transmission resources or the two transmission resource bundles are ignored during HARQ feedback-based transmission or retransmission.

Ignoring at least partial transmission resources in the two transmission resources or the two transmission resource bundles means that HARQ feedback-based transmission or retransmission is not mapped on the at least partial transmission resources in the two transmission resources or the at least two resource bundles. Optionally, all transmission resources in the two transmission resources or the two transmission resource bundles are ignored.

For example, one piece of SL DCI provides three transmission resources, which are represented as a resource 1, a resource 2, and a resource 3 in a chronological order, where an interval between the resource 1 and the resource 2 meets the target interval requirement. In this case, HARQ feedback-based transmission or retransmission is not mapped on the resource 1, and the resource 2 is ignored. If the resource 1 and the resource 3 meet the target interval requirement, HARQ feedback-based retransmission may be performed on the resource 3. How to determine that a resource to be ignored may be implemented by a user, and may be agreed upon according to some rules. For example, it is agreed to ignore a resource that is in the two transmission resources or in the two transmission resource bundles and that is later in time. Specifically, a resource with later start time or end time may be ignored.

In some embodiments of this application, optionally, the communication device is a control node, and the determining a transmission manner based on whether an interval between two transmission resources or two transmission resource bundles meets a target interval requirement includes: If the interval between the two transmission resources or the two transmission resource bundles does not meet the target interval requirement, determining that the transmission manner includes at least one of the following:

(a) No feedback resource is provided.

(b) It is considered or indicated that a terminal maps (or transmits) non-HARQ feedback-based MAC PDU or TB transmission or retransmission on at least partial transmission resources in the two transmission resources or the two transmission resource bundles (for example, determining or instructing the terminal to map (or transmit) non-HARQ feedback-based MAC PDU or TB transmission or retransmission on at least partial transmission resources in the two transmission resources or the two transmission resource bundles).

For example, SL resource control signaling may be used to instruct the terminal to map (or transmit) non-HARQ feedback-based MAC PDU or TB transmission or retransmission on at least partial transmission resources in the two transmission resources or the two transmission resource bundles.

The mapping non-HARQ feedback-based MAC PDU transmission or retransmission may also be described as: not performing HARQ feedback-based MAC PDU transmission.

Optionally, it is considered or indicated that the terminal maps (or transmits) non-HARQ feedback-based MAC PDU or TB transmission or retransmission on the two transmission resources or the two transmission resource bundles (for example, determining or instructing the terminal to map (or transmit) non-HARQ feedback-based MAC PDU or TB transmission or retransmission on the two transmission resources or the two transmission resource bundles).

Further optionally, it is considered or indicated that the terminal maps (or transmits) non-HARQ feedback-based MAC PDU or TB transmission or retransmission on each transmission resource in the target transmission resources (for example, determining or instructing the terminal to map (or transmit) non-HARQ feedback-based MAC PDU or TB transmission or retransmission on each transmission resource in the target transmission resources).

(c) It is considered or indicated that a terminal ignores at least partial transmission resources in the two transmission resources or the two transmission resource bundles during transmission (for example, determining or instructing the terminal to at least partial transmission resources in the two transmission resources or the two transmission resource bundles are ignored during transmission).

(d) It is considered or indicated that a terminal ignores at least partial transmission resources in the two transmission resources or the two transmission resource bundles when performing HARQ feedback-based MAC PDU or TB transmission or retransmission (for example, determining or instructing the terminal to ignore at least partial transmission resources in the two transmission resources or the two transmission resource bundles when performing HARQ feedback-based MAC PDU or TB transmission or retransmission).

Ignoring at least partial transmission resources in the two transmission resources or the two transmission resource bundles means that HARQ feedback-based MAC PDU or TB transmission or retransmission is not mapped on the at least partial transmission resources in the two transmission resources or the at least two resource bundles.

In some embodiments of this application, optionally, the communication device is a terminal, and the determining a transmission manner based on whether an interval between two transmission resources or two transmission resource bundles meets a target interval requirement includes: If the interval between the two transmission resources or the two transmission resource bundles does not meet the target interval requirement, determining that the transmission manner includes at least one of the following:

(a) It is considered that the control node provides no feedback resource (for example, it is determined that the control node provides no feedback resource).

That it is considered that the control node provides no feedback resource may also be described as follows: It is expected or assumed that the control node provides no feedback resource (for example, that it is determined that the control node provides no feedback resource may also be described as follows: It is expected or assumed that the control node provides no feedback resource).

(b) Non-HARQ feedback-based MAC PDU transmission is mapped on at least partial transmission resources in the two transmission resources or the two transmission resource bundles.

The mapping non-HARQ feedback-based MAC PDU transmission or retransmission may also be described as: not performing HARQ feedback-based MAC PDU transmission.

(c) At least partial transmission resources in the two transmission resources or the two transmission resource bundles are ignored during transmission.

(d) At least partial transmission resources in the two transmission resources or the two transmission resource bundles are ignored during HARQ feedback-based MAC PDU or TB transmission or retransmission.

Ignoring at least partial transmission resources in the two transmission resources or the two transmission resource bundles means that HARQ feedback-based MAC PDU or TB transmission or retransmission is not mapped on the at least partial transmission resources in the two transmission resources or the at least two resource bundles.

In the foregoing embodiment, the feedback resource includes:

an uplink feedback resource, for example, a PUCCH and/or a PUSCH;

or an uplink feedback resource and a sidelink feedback resource (for example, a PSFCH);

or a sidelink feedback resource.

In this embodiment of this application, optionally, the control node may indicate, by using the sidelink resource control signaling, that there is no feedback resource or that no feedback resource is configured.

(2) Then, a method for determining the transmission manner when the interval between the two transmission resources or the two transmission resource bundles meets the target interval requirement is described.

In this embodiment of this application, optionally, and the determining a transmission manner based on whether an interval between two transmission resources or two transmission resource bundles meets a target interval requirement includes:

if the interval between the two transmission resources or the two transmission resource bundles meets the target interval requirement, determining that the transmission manner includes at least one of the following:

(a) HARQ enable/disable indication information of each transmission resource indicates enable (enable) or disable.

In other words, the determined HARQ feedback manner is: HARQ enable/disable indication information of each transmission resource indicates enable or disable.

Each transmission resource may be each transmission resource in the target transmission resources, or may be each transmission resource in the two transmission resources or the two transmission resource bundles.

Optionally, the HARQ enable/disable indication information is HARQ enable/disable indication information in the sidelink control signaling (such as SCI).

Optionally, that the HARQ enable/disable indication information of each transmission resource indicates enable may be that the HARQ enable/disable indication information of each transmission resource indicates that a value corresponding to enable.

That the HARQ enable/disable indication information of each transmission resource indicates disable may be that the HARQ enable/disable indication information of each transmission resource indicates that a value corresponding to disable.

(b) HARQ feedback-based transmission or retransmission is mapped (or transmitted) on each transmission resource, or non-HARQ feedback-based transmission or retransmission is mapped on each transmission resource.

HARQ feedback-based transmission or retransmission may be HARQ feedback-based transmission or retransmission of data of a logical channel, or HARQ feedback-based MAC PDU or TB transmission or retransmission.

Optionally, that the interval between the two transmission resources or the two transmission resource bundles meets the target interval requirement may also be described as follows: An interval between two transmission resources or two transmission resource bundles in the target transmission resources meets the target interval requirement, or an interval between two adjacent transmission resources or two adjacent transmission resource bundles in the target transmission resources meets the target interval requirement, or an interval between all transmission resources or all two transmission resource bundles in the target transmission resources meets the target interval requirement, or an interval between two preset transmission resources or two preset transmission resource bundles in the target transmission resources meets the target interval requirement.

Optionally, that the interval between the two transmission resources or the two transmission resource bundles meets the target interval requirement may also be described as follows: All selected target transmission resources used for one TB or MAC PDU meets the target interval requirement. For example, when HARQ feedback-based transmission or retransmission needs to be performed on one TB or MAC PDU, all transmission resources selected for the TB or the MAC PDU meet the target interval requirement.

In this embodiment of this application, optionally, and the determining a transmission manner based on whether an interval between two transmission resources or two transmission resource bundles meets a target interval requirement includes:

if the interval between the two transmission resources or the two transmission resource bundles meets the target interval requirement, determining that the transmission manner includes one of the following:

HARQ enable/disable indication information of each transmission resource indicates enable, and HARQ feedback-based transmission or retransmission is mapped on each transmission resource; and HARQ enable/disable indication information of each transmission resource indicates disable, and non-HARQ feedback-based transmission or retransmission is mapped on the transmission resource.

In this embodiment of this application, optionally, and the determining a transmission manner based on whether an interval between two transmission resources or two transmission resource bundles meets a target interval requirement includes:

if the interval between the two transmission resources or the two transmission resource bundles meets the target interval requirement and there is a feedback resource, HARQ enable/disable indication information of each transmission resource indicates enable, and/or HARQ feedback-based transmission or retransmission is mapped on each transmission resource; and/or if the interval between the two transmission resources or the two transmission resource bundles meets the target interval requirement and there is no feedback resource, HARQ enable indication information of each transmission resource indicates disable, and/or non-HARQ feedback-based transmission or retransmission is mapped on each transmission resource.

In the foregoing embodiment, the feedback resource includes one of the following:

an uplink feedback resource, for example, a PUCCH and/or a PUSCH;

or an uplink feedback resource and a sidelink feedback resource (for example, a PSFCH);

or a sidelink feedback resource.

That there is an uplink feedback resource is, for example, the sidelink resource control signaling indicates that there is an uplink feedback resource, or an uplink feedback resource is configured.

That there is a sidelink feedback resource is, for example, a resource pool with a PSFCH is scheduled by the sidelink resource control signaling, for example, there is a PSFCH in a resource pool in which the sidelink configured grant is located.

That there is no feedback resource may be that there is no candidate or valid feedback resource.

That there is no uplink feedback resource is, for example, the sidelink resource control signaling indicates that there is no uplink feedback resource, or an uplink feedback resource is not configured.

That there is no sidelink feedback resource is, for example, the sidelink resource control signaling indicates that there is no resource pool with a PSFCH, for example, there is no PSFCH in a resource pool in which the sidelink configured grant is located.

In some embodiments of this app, optionally, the communication device is a control node, and the determining a transmission manner based on whether an interval between two transmission resources or two transmission resource bundles meets a target interval requirement includes: It is ensured that the interval between the two transmission resources or the two transmission resource bundles meets the target interval requirement. For example, the interval between the two transmission resources or the two transmission resource bundles is configured to meet the target interval requirement.

In some embodiments of this app, optionally, the communication device is a terminal, and the determining a transmission manner based on whether an interval between two transmission resources or two transmission resource bundles meets a target interval requirement includes: It is considered that the interval between the two transmission resources or the two transmission resource bundles meets the target interval requirement (for example, determining that the interval between the two transmission resources or the two transmission resource bundles meets the target interval requirement).

In some embodiments of this application, optionally, the communication device is a control node, and the method further includes:

if at least one of the following conditions is met, ensuring that the interval between the two transmission resources or the two transmission resource bundles (for example, the interval between the two transmission resources or the two transmission resource bundles is configured to meet the target interval requirement):

HARQ feedback-based transmission or retransmission needs to be performed; and there is a feedback resource.

In some embodiments of this application, optionally, the communication device is a terminal, and the method further includes:

if at least one of the following conditions is met, considering that the interval between the two transmission resources or the two transmission resource bundles (for example, determining that the interval between the two transmission resources or the two transmission resource bundles meets the target interval requirement):

HARQ feedback-based transmission or retransmission needs to be performed; and there is a feedback resource.

HARQ feedback-based transmission or retransmission needs to be performed, for example, HARQ feedback-based transmission or retransmission needs to be performed for a MAC PDU.

In the foregoing embodiment, the feedback resource includes one of the following:

an uplink feedback resource, for example, a PUCCH and/or a PUSCH;

or an uplink feedback resource and a sidelink feedback resource (for example, a PSFCH);

or a sidelink feedback resource.

In this embodiment of this application, the sidelink resource control signaling may be used to indicate that there is an uplink feedback resource or an uplink feedback resource is configured. The sidelink resource control signaling may be used to indicate there is a resource pool with a sidelink feedback resource. For example, there is a PSFCH in a resource pool in which the sidelink configured grant is located.

In some embodiments of this application, optionally, the communication device is a control node, and the method further includes:

ensuring that both the following two conditions are met (for example, it is configured that both the following two conditions are met): the interval between the two transmission resources or the two transmission resource bundles does not meet the target interval requirement; and a first condition.

In some embodiments of this app, optionally, the communication device is a terminal, and the determining a transmission manner based on whether an interval between two transmission resources or two transmission resource bundles meets a target interval requirement includes: considering that both the following two conditions are met (for example, determining that both the following two conditions are met): the interval between the two transmission resources or the two transmission resource bundles does not meet the target interval requirement; and a first condition.

The first condition includes at least one of the following:

HARQ feedback-based transmission or retransmission does not need to be performed;

non-HARQ feedback-based transmission or retransmission is performed; and there is no feedback resource.

There is no sequence requirement for that the interval between the two transmission resources or the two transmission resource bundles does not meet the target interval requirement and the first condition.

HARQ feedback-based transmission or retransmission does not need to be performed, for example, HARQ feedback-based transmission or retransmission does not need to be performed for a MAC PDU or a TB.

That non-HARQ feedback-based transmission or retransmission is performed may be, for example, non-HARQ feedback-based transmission or retransmission is performed for a MAC PDU or a TB.

In the foregoing embodiment, the feedback resource includes:

an uplink feedback resource, for example, a PUCCH and/or a PUSCH;

or an uplink feedback resource and a sidelink feedback resource (for example, a PSFCH);

or a sidelink feedback resource.

That there is no uplink feedback resource is, for example, the sidelink resource control signaling indicates that there is no feedback resource, or a feedback resource is not configured.

That there is no sidelink feedback resource is, for example, the sidelink resource control signaling indicates that there is no resource pool with a PSFCH, for example, there is no PSFCH in a resource pool in which the sidelink configured grant is located.

In the foregoing embodiment of this application, optionally, the SCI is first stage (1st stage) SCI, such as an SCI format 1-A.

In the foregoing embodiment of this application, when providing multiple transmission resources or transmission resource bundles, the control node may dynamically determine a transmission manner based on whether transmission resources or transmission resource bundles provided by the control node meet a target interval requirement, for example, whether to enable HARQ feedback (a HARQ feedback manner), to adapt to a characteristic of a packet, so as to ensure, during HARQ feedback-based transmission or retransmission, that a next transmission resource appears after TX UE demodulates feedback information, thereby avoiding a waste of transmission resources and ensuring a low delay, reliability, and resource utilization.

It should be noted that, the sidelink transmission method provided in this embodiment of this application may be performed by a sidelink transmission apparatus or a control module that is in the sidelink transmission apparatus and that is configured to perform the sidelink transmission method. In this embodiment of this application, the sidelink transmission apparatus provided in the embodiments of this application is described by using an example in which the sidelink transmission apparatus performs the sidelink transmission method.

Figure 7:
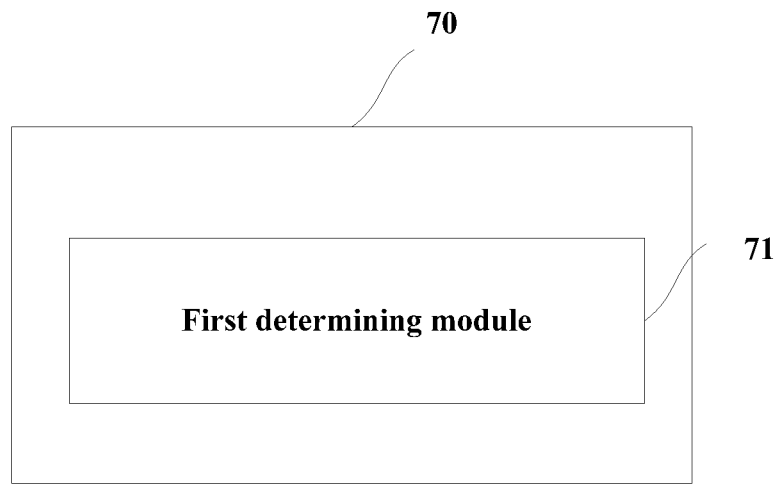
FIG. 7 is a schematic diagram of a structure of a sidelink transmission apparatus according to an embodiment of this application.

Referring to FIG. 7, an embodiment of this application provides a sidelink transmission apparatus 70, including:

a first determining module 71, configured to determine a transmission manner based on whether an interval between two transmission resources or two transmission resource bundles meets a target interval requirement, where the transmission manner includes a HARQ feedback manner, and the transmission resource or the transmission resource bundle is a transmission resource or a transmission resource bundle provided in sidelink resource control signaling.

Optionally, the two transmission resources are two transmission resources in target transmission resources; and the two transmission resource bundles are two transmission resource bundles in the target transmission resources.

Optionally, the target transmission resource is at least one of the following:

a transmission resource used for one transport block or one MAC PDU;

a transmission resource indicated in dynamic control signaling; and a transmission resource indicated in semi-static control signaling.

Optionally, the sidelink resource control signaling includes at least one of the following:

sidelink downlink control information;
a sidelink configuration grant;
a MAC CE;
RRC signaling; and
a predetermined sidelink signal or channel.

Optionally, the first determining module 71 is configured to: if the interval between the two transmission resources or the two transmission resource bundles does not meet the target interval requirement, determine that the transmission manner includes at least one of the following:

HARQ enable/disable indication information of each transmission resource indicates disable;

at least partial transmission resources in the two transmission resources or the two transmission resource bundles are ignored during transmission;

at least partial transmission resources in the two transmission resources or the two transmission resource bundles are ignored during HARQ feedback-based transmission or retransmission; and non-HARQ feedback-based transmission or retransmission is mapped on at least partial transmission resources in the two transmission resources or the two transmission resource bundles.

Optionally, the sidelink transmission apparatus is a control node, and the first determining module 71 is configured to: if the interval between the two transmission resources or the two transmission resource bundles does not meet the target interval requirement, determine that the transmission manner includes at least one of the following:

no feedback resource is provided;

considering (for example, determining) or indicating that a terminal ignores at least partial transmission resources in the two transmission resources or the two transmission resource bundles during transmission;

considering (for example, determining) or indicating that a terminal ignores at least partial transmission resources in the two transmission resources or the two transmission resource bundles during HARQ feedback-based MAC PDU or TB transmission or retransmission; and considering (for example, determining) or indicating that a terminal maps non-HARQ feedback-based media access control protocol data unit MAC PDU or TB transmission or retransmission on at least partial transmission resources in the two transmission resources or the two transmission resource bundles.

The feedback resource includes an uplink feedback resource, an uplink feedback resource and a sidelink feedback resource, or a sidelink feedback resource.

The communication device is a terminal, and the first determining module 71 is configured to: if the interval between the two transmission resources or the two transmission resource bundles does not meet the target interval requirement, determine that the transmission manner includes at least one of the following:

considering (for example, determining) that the control node provides no feedback resource;

at least partial transmission resources in the two transmission resources or the two transmission resource bundles are ignored during transmission;

at least partial transmission resources in the two transmission resources or the two transmission resource bundles are ignored during HARQ feedback-based MAC PDU or TB transmission or retransmission; and non-HARQ feedback-based MAC PDU transmission is mapped on at least partial transmission resources in the two transmission resources or the two transmission resource bundles.

The feedback resource includes an uplink feedback resource, an uplink feedback resource and a sidelink feedback resource, or a sidelink feedback resource.

Optionally, if the interval between the two transmission resources or the two transmission resource bundles meets the target interval requirement, determining that the transmission manner includes at least one of the following:

HARQ enable/disable indication information of each transmission resource indicates enable or disable; and HARQ feedback-based transmission or retransmission is mapped on each transmission resource, or non-HARQ feedback-based transmission or retransmission is mapped on each transmission resource.

Optionally, if the interval between the two transmission resources or the two transmission resource bundles meets the target interval requirement, determining that the transmission manner includes one of the following:

HARQ enable/disable indication information of each transmission resource indicates enable, and HARQ feedback-based transmission or retransmission is mapped on each transmission resource; and HARQ enable/disable indication information of each transmission resource indicates disable, and non-HARQ feedback-based transmission or retransmission is mapped on the transmission resource.

Optionally, the first determining module 71 is configured to:

if the interval between the two transmission resources or the two transmission resource bundles meets the target interval requirement and there is a feedback resource, HARQ enable/disable indication information of each transmission resource indicates enable, and/or HARQ feedback-based transmission or retransmission is mapped on each transmission resource; and/or if the interval between the two transmission resources or the two transmission resource bundles meets the target interval requirement and there is no feedback resource, HARQ enable/disable indication information of each transmission resource indicates disable, and/or non-HARQ feedback-based transmission or retransmission is mapped on each transmission resource.

The feedback resource includes an uplink feedback resource, or the feedback resource includes an uplink feedback resource and a sidelink feedback resource, or the feedback resource includes a sidelink feedback resource.

Optionally, the sidelink transmission apparatus is a control node, and further includes:

a first configuration module, configured to configure the interval between the two transmission resources or the two transmission resource bundles to meet the target interval requirement.

The sidelink transmission apparatus is a terminal, and further includes:

a second determining module, configured to determine that the interval between the two transmission resources or the two transmission resource bundles meets the target interval requirement.

Optionally, the sidelink transmission apparatus is a control node. The first configuration module is configured to: if at least one of the following conditions is met, configure the interval between the two transmission resources or the two transmission resource bundles to meet the target interval requirement:

HARQ feedback-based transmission or retransmission needs to be performed; and there is a feedback resource.

The sidelink transmission apparatus is a terminal. The second determining module is configured to: if at least one of the following conditions is met, determine that the interval between the two transmission resources or the two transmission resource bundles meets the target interval requirement:

HARQ feedback-based transmission or retransmission needs to be performed; and there is a feedback resource.

The feedback resource includes an uplink feedback resource, or the feedback resource includes an uplink feedback resource and a sidelink feedback resource, or the feedback resource includes a sidelink feedback resource.

Optionally, the sidelink transmission apparatus is a control node, and further includes:

a second configuration module, configured to configure both the following two conditions to be met:

the interval between the two transmission resources or the two transmission resource bundles does not meet the target interval requirement; and a first condition.

The sidelink transmission apparatus is a terminal, and further includes:

a third determining module, configured to determine that both the following two conditions are met:

the interval between the two transmission resources or the two transmission resource bundles does not meet the target interval requirement; and a first condition.

The first condition includes at least one of the following:

HARQ feedback-based transmission or retransmission does not need to be performed;

non-HARQ feedback-based transmission or retransmission is performed; and there is no feedback resource, where the feedback resource includes an uplink feedback resource, or the feedback resource includes an uplink feedback resource and a sidelink feedback resource, or the feedback resource includes a sidelink feedback resource.

Optionally, that the interval between the two transmission resource bundles meets the target interval requirement includes:

an $I^{th}$ transmission resource in one of the two transmission resource bundles and a $J^{th}$ transmission resource in the other transmission resource bundle meet the target interval requirement; where I and J are positive integers.

Optionally, the two transmission resource bundles are transmission resource bundles with a same HARQ process ID that are granted by a same sidelink configuration;

or the two transmission resource bundles are transmission resource bundles that are in two adjacent periodicities and that are granted by a same sidelink configuration.

Optionally, the meeting the target interval requirement includes one of the following:

greater than or equal to a+b;

greater than or equal to a+b+c;

greater than or equal to a+b+c+d; where a is time between data transmission of the first one in the two transmission resources or the two transmission resource bundles and a corresponding PSFCH;

b is time required by a PSFCH to receive and process retransmission preparations;

c is time required for processing PUCCH or PUSCH transmission; and d is time required for processing a PDCCH.

In the foregoing embodiment of this application, when providing multiple transmission resources or transmission resource bundles, the control node may dynamically determine a transmission manner based on whether transmission resources or transmission resource bundles provided by the control node meet a target interval requirement, for example, whether to enable HARQ feedback (a HARQ feedback manner), to adapt to a characteristic of a packet, so as to ensure, during HARQ feedback-based transmission or retransmission, that a next transmission resource appears after TX UE demodulates feedback information, thereby avoiding a waste of transmission resources and ensuring a low delay, reliability, and resource utilization.

The sidelink transmission apparatus in this embodiment of this application may be an apparatus, or may be a component, an integrated circuit, or a chip in a terminal or a control node. The apparatus may be a mobile terminal, or may be a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The sidelink transmission apparatus in this embodiment of this application may be an apparatus with an operating system. The operating system may be an Android (Android) operating system, may be an iOS operating system, or may be another possible operating system. This is not specifically limited in this embodiment of this application.

The sidelink transmission apparatus provided in this embodiment of this application can implement processes implemented in the method embodiment of FIG. 6, and a same technical effect is achieved. To avoid repetition, details are not described herein again.

Figure 8:
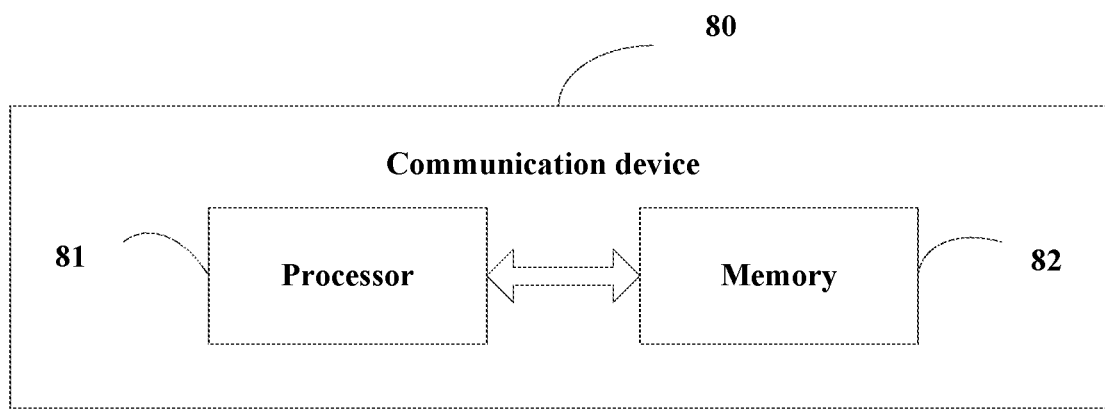
FIG. 8 is a schematic diagram of a structure of a communication device according to an embodiment of this application.

Optionally, as shown in FIG. 8, an embodiment of this application further provides a communication device 80, including a processor 81, a memory 82, a program or an instruction that is stored in the memory 82 and that can run on the processor 81. For example, when the communication device 80 is a terminal, the program or the instruction is executed by the processor 81 to implement processes of the method embodiment of the foregoing sidelink transmission method, and a same technical effect can be achieved. When the communication device 80 is a network side device, when the program or the instruction is executed by the processor 81, processes of the method embodiment of the foregoing sidelink transmission method are implemented, and a same technical effect can be achieved. To avoid repetition, details are not described herein again.

Figure 9:
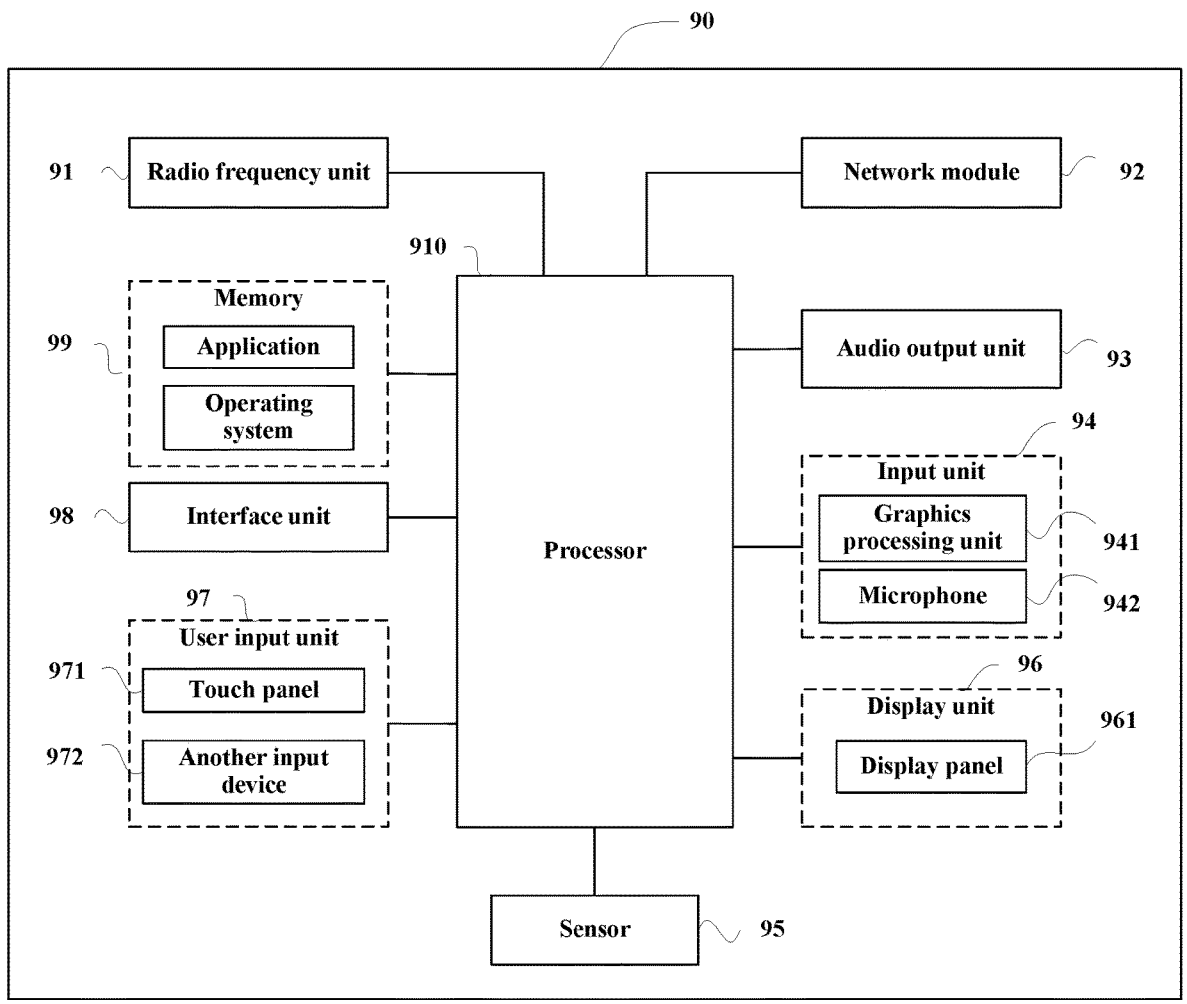
FIG. 9 is a schematic diagram of a structure of a terminal according to an embodiment of this application.

FIG. 9 is a schematic diagram of a hardware structure of a terminal according to an embodiment of this application. The terminal 90 includes but is not limited to components such as a radio frequency unit 91, a network module 92, an audio output unit 93, an input unit 94, a sensor 95, a display unit 96, a user input unit 97, an interface unit 98, a memory 99, and a processor 910.

It may be understood by a person skilled in the art that the terminal 90 may further include a power supply (such as a battery) that supplies power to each component. The power supply may be logically connected to the processor 910 by using a power management system, to implement functions such as charging, discharging, and power consumption management by using the power management system. A structure of the terminal shown in FIG. 9 does not constitute a limitation on the terminal device, and may include more or fewer parts than those shown in the figure, or combine some parts, or have different part arrangements. Details are not described herein again.

It should be understood that, in this embodiment of this application, the input unit 94 may include a graphics processing unit (GPU) 941 and a microphone 942. The graphics processing unit 941 processes image data of a static picture or a video obtained by an image capture apparatus (such as a camera) in a video capture mode or an image capture mode. The display unit 96 may include a display panel 961, and the display panel 961 may be configured in a form of a liquid crystal display, an organic light emitting diode, or the like. The user input unit 97 includes a touch panel 971 and another input device 972. The touch panel 971 is also referred to as a touchscreen. The touch panel 971 may include two parts: a touch detection apparatus and a touch controller. The another input device 972 may include but is not limited to one or more of a physical keyboard, a function key (such as a volume control key or an on/off key), a trackball, a mouse, a joystick, and the like. Details are not described herein.

In this embodiment of this application, after receiving downlink data from a network side device, the radio frequency unit 91 sends the downlink data to the processor 910 for processing, and sends uplink data to the network side device. Generally, the radio frequency unit 91 includes but is not limited to an antenna, at least one amplifier, a transceiver, a coupler, a low noise amplifier, a duplexer, and the like.

The memory 99 may be configured to store a software program or an instruction and various data. The memory 99 may mainly include a storage program or instruction area and a storage data area, where the storage program or instruction area may store an operating system, an application program or an instruction required by at least one function (such as a sound play function or an image play function), and the like. In addition, the memory 99 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash memory device, or another non-volatile solid-state storage device.

The processor 910 may include one or more processing units. Optionally, the processor 910 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 910.

The processor 910 is configured to determine a transmission manner based on whether an interval between two transmission resources or two transmission resource bundles meets a target interval requirement, where the transmission manner includes a HARQ feedback manner, and the transmission resource or the transmission resource bundle is a transmission resource or a transmission resource bundle provided in sidelink resource control signaling.

In the foregoing embodiment of this application, when providing multiple transmission resources or transmission resource bundles, a control node may dynamically determine a transmission manner based on whether transmission resources or transmission resource bundles provided by the control node meet a target interval requirement, for example, whether to enable HARQ feedback (a HARQ feedback manner), to adapt to a characteristic of a packet, so as to ensure, during HARQ feedback-based transmission or retransmission, that a next transmission resource appears after TX UE demodulates feedback information, thereby avoiding a waste of transmission resources and ensuring a low delay, reliability, and resource utilization.

Optionally, the two transmission resources are two transmission resources in target transmission resources; and the two transmission resource bundles are two transmission resource bundles in the target transmission resources.

Optionally, the target transmission resource is at least one of the following:

a transmission resource used for one transport block or one MAC PDU;

a transmission resource indicated in dynamic control signaling; and a transmission resource indicated in semi-static control signaling.

Optionally, the target transmission resource is provided in sidelink resource control signaling, and the sidelink resource control signaling includes at least one of the following:

sidelink downlink control information;

a sidelink configuration grant;

a MAC CE;

RRC signaling; and a predetermined sidelink signal or channel.

Optionally, the processor 910 is further configured to: if the interval between the two transmission resources or the two transmission resource bundles does not meet the target interval requirement, determine that the transmission manner includes at least one of the following:

HARQ enable/disable indication information of each transmission resource indicates disable;

at least partial transmission resources in the two transmission resources or the two transmission resource bundles are ignored during transmission;

at least partial transmission resources in the two transmission resources or the two transmission resource bundles are ignored during HARQ feedback-based transmission or retransmission; and non-HARQ feedback-based transmission or retransmission is mapped on at least partial transmission resources in the two transmission resources or the two transmission resource bundles.

Optionally, the communication device is a control node, and the processor 910 is further configured to: if the interval between the two transmission resources or the two transmission resource bundles does not meet the target interval requirement, determine that the transmission manner includes at least one of the following:

no feedback resource is provided;

it is determined or indicated that a terminal ignores at least partial transmission resources in the two transmission resources or the two transmission resource bundles during transmission;

it is determined or indicated that a terminal ignores at least partial transmission resources in the two transmission resources or the two transmission resource bundles during HARQ feedback-based MAC PDU or TB transmission or retransmission; and it is determined or indicated that a terminal maps non-HARQ feedback-based media access control protocol data unit MAC PDU or TB transmission or retransmission on at least partial transmission resources in the two transmission resources or the two transmission resource bundles.

The feedback resource includes an uplink feedback resource, or the feedback resource includes an uplink feedback resource and a sidelink feedback resource, or the feedback resource includes a sidelink feedback resource.

Optionally, the communication device is a terminal, and the processor 910 is further configured to: if the interval between the two transmission resources or the two transmission resource bundles does not meet the target interval requirement, determine that the transmission manner includes at least one of the following:

it is determined that the control node provides no feedback resource;

at least partial transmission resources in the two transmission resources or the two transmission resource bundles are ignored during transmission;

at least partial transmission resources in the two transmission resources or the two transmission resource bundles are ignored during HARQ feedback-based MAC PDU or TB transmission or retransmission; and non-HARQ feedback-based MAC PDU transmission is mapped on at least partial transmission resources in the two transmission resources or the two transmission resource bundles.

The feedback resource includes an uplink feedback resource, or the feedback resource includes an uplink feedback resource and a sidelink feedback resource, or the feedback resource includes a sidelink feedback resource.

Optionally, the processor 910 is further configured to: if the interval between the two transmission resources or the two transmission resource bundles meets the target interval requirement, determine that the transmission manner includes at least one of the following:

HARQ enable/disable indication information of each transmission resource indicates enable or disable; and HARQ feedback-based transmission or retransmission is mapped on each transmission resource, or non-HARQ feedback-based transmission or retransmission is mapped on each transmission resource.

Optionally, the processor 910 is further configured to: if the interval between the two transmission resources or the two transmission resource bundles meets the target interval requirement, determine that the transmission manner includes one of the following:

HARQ enable/disable indication information of each transmission resource indicates enable, and HARQ feedback-based transmission or retransmission is mapped on each transmission resource; and HARQ enable/disable indication information of each transmission resource indicates disable, and non-HARQ feedback-based transmission or retransmission is mapped on the transmission resource.

Optionally, the processor 910 is further configured to:

if the interval between the two transmission resources or the two transmission resource bundles meets the target interval requirement and there is a feedback resource, HARQ enable/disable indication information of each transmission resource indicates enable, and/or HARQ feedback-based transmission or retransmission is mapped on each transmission resource; and if the interval between the two transmission resources or the two transmission resource bundles meets the target interval requirement and there is no feedback resource, HARQ enable/disable indication information of each transmission resource indicates disable, and/or non-HARQ feedback-based transmission or retransmission is mapped on each transmission resource.

The feedback resource includes an uplink feedback resource, an uplink feedback resource and a sidelink feedback resource, or a sidelink feedback resource.

Optionally, the communication device is a control node, and the processor 910 is further configured to configure the interval between the two transmission resources or the two transmission resource bundles to meet the target interval requirement.

Optionally, the communication device is a terminal, and the processor 910 is further configured to determine that the interval between the two transmission resources or the two transmission resource bundles meets the target interval requirement.

Optionally, the communication device is a control node, and the processor 910 is further configured to: if at least one of the following conditions is met, configure the interval between the two transmission resources or the two transmission resource bundles to meet the target interval requirement:

HARQ feedback-based transmission or retransmission needs to be performed; and there is a feedback resource.

Optionally, the communication device is a terminal, and the processor 910 is further configured to: if at least one of the following conditions is met, determine that the interval between the two transmission resources or the two transmission resource bundles meets the target interval requirement:

HARQ feedback-based transmission or retransmission needs to be performed; and there is a feedback resource.

The feedback resource includes an uplink feedback resource, or the feedback resource includes an uplink feedback resource and a sidelink feedback resource, or the feedback resource includes a sidelink feedback resource.

Optionally, the communication device is a control node, and the processor 910 is further configured to configure both the following two conditions to be met:

the interval between the two transmission resources or the two transmission resource bundles does not meet the target interval requirement; and a first condition.

Optionally, the communication device is a terminal, and the processor 910 is further configured to determine that both the following two conditions are met:

the interval between the two transmission resources or the two transmission resource bundles does not meet the target interval requirement; and a first condition.

The first condition includes at least one of the following:

HARQ feedback-based transmission or retransmission does not need to be performed;

non-HARQ feedback-based transmission or retransmission is performed; and there is no feedback resource, where the feedback resource includes an uplink feedback resource, or the feedback resource includes an uplink feedback resource and a sidelink feedback resource, or the feedback resource includes a sidelink feedback resource.

Optionally, that the interval between the two transmission resource bundles meets the target interval requirement includes:

an $I^{th}$ transmission resource in one of the two transmission resource bundles and a $J^{th}$ transmission resource in the other transmission resource bundle meet the target interval requirement; where I and J are positive integers.

Optionally, the two transmission resource bundles are transmission resource bundles with a same HARQ process ID that are granted by a same sidelink configuration;

or the two transmission resource bundles are transmission resource bundles that are in two adjacent periodicities and that are granted by a same sidelink configuration.

Optionally, the meeting the target interval requirement includes one of the following:

greater than or equal to a+b;

greater than or equal to a+b+c;

greater than or equal to a+b+c+d; where a is time between data transmission of the first one in the two transmission resources or the two transmission resource bundles and a corresponding PSFCH;

b is time required by a PSFCH to receive and process retransmission preparations;

c is time required for processing PUCCH or PUSCH transmission; and a is time required for processing a PDCCH.

Figure 10:
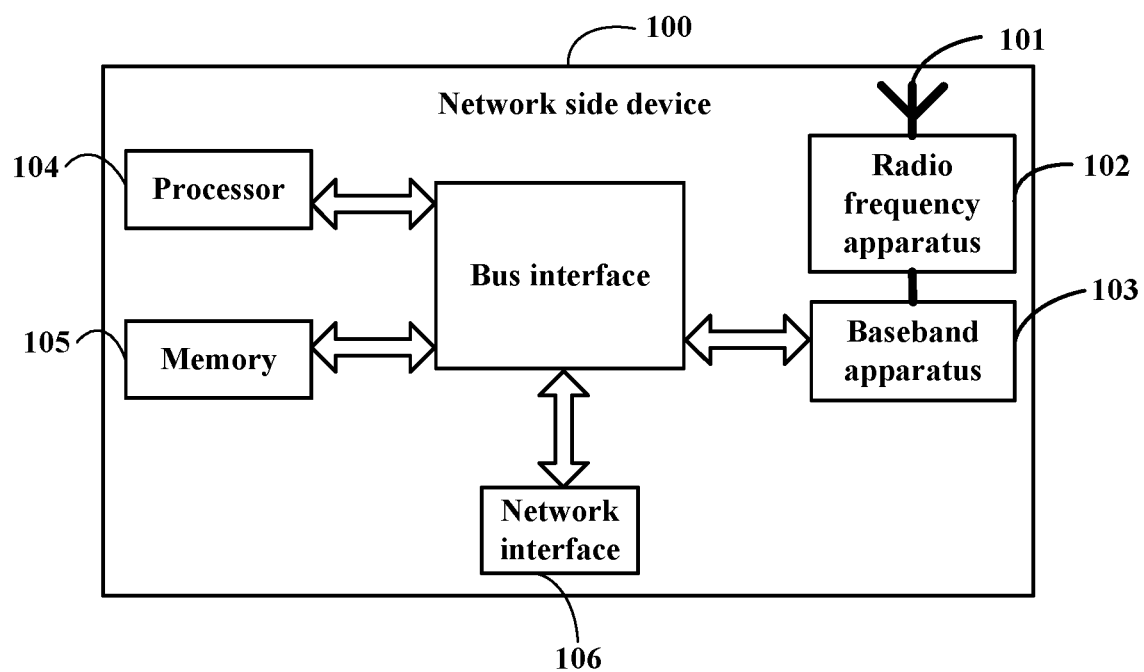
FIG. 10 is a schematic diagram of a structure of a network side device according to an embodiment of this application.

Optionally, an embodiment of this application further provides a network side device. As shown in FIG. 10, the network side device 100 includes an antenna 101, a radio frequency apparatus 102, and a baseband apparatus 103. The antenna 101 is connected to the radio frequency apparatus 102. In an uplink direction, the radio frequency apparatus 102 receives information by using the antenna 101, and sends the received information to the baseband apparatus 103 for processing. In a downlink direction, the baseband apparatus 103 processes to-be-sent information, and sends the to-be-sent information to the radio frequency apparatus 102. After processing the received information, the radio frequency apparatus 102 sends the information by using the antenna 101.

The foregoing band processing apparatus may be located in the baseband apparatus 103. In the foregoing embodiment, a method performed by the network side device may be implemented in the baseband apparatus 103. The baseband apparatus 103 includes a processor 104 and a memory 105.

For example, the baseband apparatus 103 may include at least one baseband board. Multiple chips are disposed on the baseband board. As shown in FIG. 10, one chip is, for example, the processor 104, and is connected to the memory 105, to invoke a program in the memory 105 to perform an operation of the network side device shown in the foregoing method embodiment.

The baseband apparatus 103 may further include a network interface 106, configured to exchange information with the radio frequency apparatus 102, where the interface is, for example, a common public radio interface (CPRI for short).

Specifically, the network side device in this embodiment of this application further includes an instruction or a program that is stored in the memory 105 and that can run on the processor 104. The processor 104 invokes the instruction or the program in the memory 105 to perform the method performed by the modules shown in FIG. 7, and a same technical effect is achieved. To avoid repetition, details are not described herein.

An embodiment of this application further provides a readable storage medium. A program or an instruction is stored in the readable storage medium. When the program or the instruction is executed by a processor, the processes of the embodiments of the foregoing sidelink transmission method can be implemented, and a same technical effect can be achieved. To avoid repetition, details are not described herein.

The processor is a processor in the terminal in the foregoing embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communication interface, the communication interface is coupled to the processor, and the processor is configured to run a program or an instruction of a network side device to implement the processes of the embodiments of the foregoing sidelink transmission method, and a same technical effect can be achieved. To avoid repetition, details are not described herein again.

It should be understood that the chip mentioned in this embodiment of this application may also be referred to as a system-level chip, a system chip, a chip system, or a system on a chip.

It may be understood that the embodiments described in the present disclosure may be implemented by hardware, software, firmware, middleware, microcode, or a combination thereof. For hardware implementation, a module, a unit, a submodule, a subunit, or the like may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a microcontroller, a microprocessor, another electronic unit configured to perform the functions described in this application, or a combination thereof.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A sidelink transmission method performed by a communication device, comprising:
    determining a transmission manner based on whether an interval between two transmission resources or two transmission resource bundles meets a target interval requirement, and
    the transmission resource or the transmission resource bundle is a transmission resource or a transmission resource bundle provided in sidelink resource control signaling, wherein the sidelink resource control signaling comprises at least one of the following: sidelink downlink control information; or a sidelink configuration grant; wherein
    the determining a transmission manner based on whether an interval between two transmission resources or two transmission resource bundles meets a target interval requirement comprises:
    in a case that the interval between the two transmission resources or the two transmission resource bundles does not meet the target interval requirement, determining that the transmission manner comprises at least one of the following:
    at least partial transmission resources in the two transmission resources or the two transmission resource bundles are ignored during transmission; and
    at least partial transmission resources in the two transmission resources or the two transmission resource bundles are ignored during hybrid automatic repeat request (HARQ) feedback-based transmission or retransmission; wherein
    that the at least partial transmission resources in the two transmission resources or the two transmission resource bundles are ignored comprises: no transmission or retransmission being performed on the at least partial transmission resources.

2. The method according to claim 1, wherein
    the two transmission resources are two transmission resources in target transmission resources; and
    the two transmission resource bundles are two transmission resource bundles in the target transmission resources,
    wherein the target transmission resource is at least one of the following:
    a transmission resource used for one transport block (TB) or one media access control protocol data unit (MAC PDU);
    a transmission resource indicated in dynamic control signaling; or
    a transmission resource indicated in semi-static control signaling.

3. The method according to claim 1, wherein the sidelink resource control signaling further comprises at least one of the following:
    a media access control control element (MAC CE);
    radio resource control (RRC) signaling; or
    a predetermined sidelink signal or channel.

4. The method according to claim 1, wherein the determining a transmission manner based on whether an interval between two transmission resources or two transmission resource bundles meets a target interval requirement comprises:
    in a case that the interval between the two transmission resources or the two transmission resource bundles does not meet the target interval requirement, determining that the transmission manner further comprises at least one of the following:
    HARQ enable/disable indication information of each transmission resource indicates disable; and
    non-HARQ feedback-based transmission or retransmission is mapped on at least partial transmission resources in the two transmission resources or the two transmission resource bundles.

5. The method according to claim 4, wherein
    the communication device is a control node, and the determining a transmission manner based on whether an interval between two transmission resources or two transmission resource bundles meets a target interval requirement comprises:
    in a case that the interval between the two transmission resources or the two transmission resource bundles does not meet the target interval requirement, determining that the transmission manner comprises at least one of the following:
    no feedback resource is provided;
    it is determined or indicated that a terminal ignores at least partial transmission resources in the two transmission resources or the two transmission resource bundles during transmission;
    it is determined or indicated that a terminal ignores at least partial transmission resources in the two transmission resources or the two transmission resource bundles during HARQ feedback-based MAC PDU or TB transmission or retransmission; and it is determined or indicated that a terminal maps non-HARQ feedback-based MAC PDU or TB transmission or retransmission on at least partial transmission resources in the two transmission resources or the two transmission resource bundles; wherein
the feedback resource comprises an uplink feedback resource, or the feedback resource comprises an uplink feedback resource and a sidelink feedback resource, or the feedback resource comprises a sidelink feedback resource.

6. The method according to claim 4, wherein
the communication device is a terminal, and the determining a transmission manner based on whether an interval between two transmission resources or two transmission resource bundles meets a target interval requirement comprises:
in a case that the interval between the two transmission resources or the two transmission resource bundles does not meet the target interval requirement, determining that the transmission manner comprises at least one of the following:
it is determined that the control node provides no feedback resource;
at least partial transmission resources in the two transmission resources or the two transmission resource bundles are ignored during transmission;
at least partial transmission resources in the two transmission resources or the two transmission resource bundles are ignored during HARQ feedback-based MAC PDU or TB transmission or retransmission; and
non-HARQ feedback-based MAC PDU transmission is mapped on at least partial transmission resources in the two transmission resources or the two transmission resource bundles; wherein
the feedback resource comprises an uplink feedback resource, or the feedback resource comprises an uplink feedback resource and a sidelink feedback resource, or the feedback resource comprises a sidelink feedback resource.

7. The method according to claim 1, wherein the determining a transmission manner based on whether an interval between two transmission resources or two transmission resource bundles meets a target interval requirement comprises:
in a case that the interval between the two transmission resources or the two transmission resource bundles meets the target interval requirement, determining that the transmission manner comprises at least one of the following:
HARQ enable/disable indication information of each transmission resource indicates enable or disable; or
HARQ feedback-based transmission or retransmission is mapped on each transmission resource, or non-HARQ feedback-based transmission or retransmission is mapped on each transmission resource.

8. The method according to claim 7, wherein the determining a transmission manner based on whether an interval between two transmission resources or two transmission resource bundles meets a target interval requirement comprises:
in a case that the interval between the two transmission resources or the two transmission resource bundles meets the target interval requirement, determining that the transmission manner comprises one of the following:
HARQ enable/disable indication information of each transmission resource indicates enable, and HARQ feedback-based transmission or retransmission is mapped on each transmission resource; and
HARQ enable/disable indication information of each transmission resource indicates disable, and non-HARQ feedback-based transmission or retransmission is mapped on the transmission resource.

9. The method according to claim 7, wherein the determining a transmission manner based on whether an interval between two transmission resources or two transmission resource bundles meets a target interval requirement comprises at least one of the following:
in a case that the interval between the two transmission resources or the two transmission resource bundles meets the target interval requirement and there is a feedback resource, determining that the transmission manner comprises at least one of the following: HARQ enable/disable indication information of each transmission resource indicates enable; and HARQ feedback-based transmission or retransmission is mapped on each transmission resource; or
in a case that the interval between the two transmission resources or the two transmission resource bundles meets the target interval requirement and there is no feedback resource, determining that the transmission manner comprises at least one of the following: HARQ enable/disable indication information of each transmission resource indicates disable; and non-HARQ feedback-based transmission or retransmission is mapped on each transmission resource; wherein
the feedback resource comprises an uplink feedback resource, or the feedback resource comprises an uplink feedback resource and a sidelink feedback resource, or the feedback resource comprises a sidelink feedback resource.

10. The method according to claim 1, wherein
the communication device is a control node, and the method further comprises:
configuring the interval between the two transmission resources or the two transmission resource bundles to meet the target interval requirement.

11. The method according to claim 1, wherein
the communication device is a terminal, and the method further comprises:
determining that the interval between the two transmission resources or the two transmission resource bundles meets the target interval requirement.

12. The method according to claim 10, wherein
the communication device is a control node, and the method further comprises:
in a case that at least one of the following conditions is met, configuring the interval between the two transmission resources or the two transmission resource bundles to meet the target interval requirement:
HARQ feedback-based transmission or retransmission needs to be performed; and
there is a feedback resource; wherein
the feedback resource comprises an uplink feedback resource, or the feedback resource comprises an uplink feedback resource and a sidelink feedback resource, or the feedback resource comprises a sidelink feedback resource.

13. The method according to claim 11, wherein
the communication device is a terminal, and the method further comprises:
in a case that at least one of the following conditions is met, determining that the interval between the two transmission resources or the two transmission resource bundles meets the target interval requirement:
HARQ feedback-based transmission or retransmission needs to be performed; and
there is a feedback resource; wherein
the feedback resource comprises an uplink feedback resource, or the feedback resource comprises an uplink feedback resource and a sidelink feedback resource, or the feedback resource comprises a sidelink feedback resource.

14. The method according to claim 1, wherein
the communication device is a control node, and the method further comprises:
configuring that both the following two conditions are met:
the interval between the two transmission resources or the two transmission resource bundles does not meet the target interval requirement; and
a first condition; wherein
the first condition comprises at least one of the following:
HARQ feedback-based transmission or retransmission does not need to be performed;
non-HARQ feedback-based transmission or retransmission is performed; or
there is no feedback resource, wherein the feedback resource comprises an uplink feedback resource, or the feedback resource comprises an uplink feedback resource and a sidelink feedback resource, or the feedback resource comprises a sidelink feedback resource.

15. The method according to claim 1, wherein
the communication device is a terminal, and the method further comprises:
determining that both the following two conditions are met:
the interval between the two transmission resources or the two transmission resource bundles does not meet the target interval requirement; and
a first condition; wherein
the first condition comprises at least one of the following:
HARQ feedback-based transmission or retransmission does not need to be performed;
non-HARQ feedback-based transmission or retransmission is performed; or
there is no feedback resource, wherein the feedback resource comprises an uplink feedback resource, or the feedback resource comprises an uplink feedback resource and a sidelink feedback resource, or the feedback resource comprises a sidelink feedback resource.

16. The method according to claim 1, wherein that the interval between the two transmission resource bundles meets the target interval requirement comprises:
an $I^{th}$ transmission resource in one of the two transmission resource bundles and a $J^{th}$ transmission resource in the other transmission resource bundle meet the target interval requirement; wherein
I and J are positive integers.

17. The method according to claim 16, wherein
the two transmission resource bundles are transmission resource bundles with a same HARQ process ID that are granted by a same sidelink configuration;
or
the two transmission resource bundles are transmission resource bundles that are in two adjacent periodicities and that are granted by a same sidelink configuration.

18. The method according to claim 1, wherein the meeting the target interval requirement comprises one of the following:

greater than or equal to a+b;
greater than or equal to a+b+c;
greater than or equal to a+b+c+d; wherein
a is time between data transmission of the first one in the two transmission resources or the two transmission resource bundles and a corresponding PSFCH;
b is time required by a PSFCH to receive and process retransmission preparations;
c is time required for processing PUCCH or PUSCH transmission; and
a is time required for processing a PDCCH.

19. A communication device, comprising:
a processor; and
a memory storing a program or an instruction that is capable of running on the processor, wherein the program or the instruction, when executed by the processor, causes the communication device to:
determine a transmission manner based on whether an interval between two transmission resources or two transmission resource bundles meets a target interval requirement, and
the transmission resource or the transmission resource bundle is a transmission resource or a transmission resource bundle provided in sidelink resource control signaling, wherein the sidelink resource control signaling comprises at least one of the following: sidelink downlink control information; or a sidelink configuration grant; wherein
the determining a transmission manner based on whether an interval between two transmission resources or two transmission resource bundles meets a target interval requirement comprises:
in a case that the interval between the two transmission resources or the two transmission resource bundles does not meet the target interval requirement, determining that the transmission manner comprises at least one of the following:
at least partial transmission resources in the two transmission resources or the two transmission resource bundles are ignored during transmission; and
at least partial transmission resources in the two transmission resources or the two transmission resource bundles are ignored during HARQ feedback-based transmission or retransmission; wherein
that the at least partial transmission resources in the two transmission resources or the two transmission resource bundles are ignored comprises: no transmission or retransmission being performed on the at least partial transmission resources.

20. A non-transitory readable storage medium storing a program or an instruction, wherein the program or the instruction, when executed by a processor, causes the processor to:
determine a transmission manner based on whether an interval between two transmission resources or two transmission resource bundles meets a target interval requirement, and
the transmission resource or the transmission resource bundle is a transmission resource or a transmission resource bundle provided in sidelink resource control signaling, wherein the sidelink resource control signaling comprises at least one of the following: sidelink downlink control information; or a sidelink configuration grant; wherein the determining a transmission manner based on whether an interval between two transmission resources or two transmission resource bundles meets a target interval requirement comprises:

in a case that the interval between the two transmission resources or the two transmission resource bundles does not meet the target interval requirement, determining that the transmission manner comprises at least one of the following:

at least partial transmission resources in the two transmission resources or the two transmission resource bundles are ignored during transmission; and at least partial transmission resources in the two transmission resources or the two transmission resource bundles are ignored during HARQ feedback-based transmission or retransmission; wherein the at least partial transmission resources in the two transmission resources or the two transmission resource bundles are ignored comprises: no transmission or retransmission being performed on the at least partial transmission resources.

\* \* \* \* \*